United States Patent
Smith et al.

(10) Patent No.: US 6,370,880 B1
(45) Date of Patent: Apr. 16, 2002

(54) FUEL GAS MOISTURIZATION CONTROL SYSTEM FOR START-UP, HIGH LOAD OPERATION AND SHUTDOWN

(75) Inventors: Raub Warfield Smith, Ballston Lake; Jatila Ranasinghe, Niskayuna; William George Carberg, Saratoga Springs, all of NY (US)

(73) Assignee: General Electric Company, Schenectady, NY (US)

( * ) Notice: Subject to any disclaimer, the term of this patent is extended or adjusted under 35 U.S.C. 154(b) by 26 days.

(21) Appl. No.: 09/711,173

(22) Filed: Nov. 9, 2000

(51) Int. Cl.[7] .............................. F02G 3/00; F02C 7/224
(52) U.S. Cl. .............................. 60/775; 60/778; 60/790; 60/39.53
(58) Field of Search .................... 60/775, 778, 786, 60/790, 736, 39.53, 39.182

(56) References Cited

U.S. PATENT DOCUMENTS 5,050,375 A * 9/1991 Dickinson .................. 110/238
6,341,486 B2 * 1/2002 Hannemann et al. ...... 60/39.12

* cited by examiner

Primary Examiner—Charles G. Freay
(74) Attorney, Agent, or Firm—Nixon & Vanderhye PC

(57) ABSTRACT

Transient conditions, such as startup, shutdown, and contingencies, in gas turbine power plants are difficult to manage; oftentimes in designs employing a fuel moisturization system, such conditions require the use of backup fuel or a temporary fuel stream flare. The present invention enables the use of cold, dry fuel during startup and smoothly transitions to the use of moisturized, superheated fuel at high load without using a backup fuel. A bypass line allows fuel to enter a fuel superheater without passing through a fuel saturator. This enables the independent operation of the fuel superheater from the fuel saturator. Additionally, dry fuel is heated in the fuel superheater before moisturized fuel enters the fuel superheater. Gradually, a transition from dry fuel to moisturized fuel occurs before the gas turbine system operates at premixed combustion mode of operation.

8 Claims, 2 Drawing Sheets

FUEL GAS MOISTURIZATION CONTROL SYSTEM FOR START-UP, HIGH LOAD OPERATION AND SHUTDOWN

BACKGROUND OF THE INVENTION

The present invention relates to a system configuration and controls enabling a combined cycle system to transition smoothly from a startup condition initially supplying cold, dry fuel gas to the gas turbine to high load (typically premixed combustion) operation supplying heated moisturized fuel gas to the gas turbine and from operation with heated moisturized fuel to shutdown with dry fuel.

Generally, a combined cycle power plant contains a gas turbine, a steam turbine, a heat recovery system, a fuel superheater and a fuel gas saturator. Dry cold fuel gas is supplied to the fuel gas saturator, where the fuel gas is moisturized. The fuel gas is then heated by the fuel superheater and is supplied to the gas turbine for combustion. The combustion reaction drives the turbine and a generator coupled to the turbine to produce electricity. The exhaust from the gas turbine enters a heat recovery steam generator (HRSG), which utilizes the heat from the exhaust gases to generate steam for use in the steam turbine and heat water for use in the fuel gas saturator and to superheat the fuel gas in the fuel gas superheater. The steam generated expands in the steam turbine for generating power.

Natural gas fired gas turbines with Dry Low $NO_x$ (DLN) combustion systems impose strict requirements on the fuel saturation process due to tight fuel specification tolerances for variables, such as fuel composition, heating value and temperature. Typically these systems have at least two operating modes for optimized performance: one occurs from initial ignition or startup through early loading and the other at high load conditions. Minimizing system emissions is critical during operation at high load conditions. Operation at high load uses fully premixed fuel gas where the system is finely tuned for optimal performance and typically has low tolerance for variations in the fuel supply. Variations in the properties of cold, dry fuel gas and heated, moisturized fuel gas are, however, greatly different. As a consequence, the fuel moisturization system must achieve stable operation with heated and moisturized fuel before the combustion system reaches fully premixed operation. A characteristic fuel property important for combustion stability is the Wobbe number defined as follows:

$$\text{Wobbe Number} = \frac{\text{Fuel Lower Heating Value (Btu}/scf)}{\sqrt{\text{(Fuel Temperature (Deg. Rankine)} \times \text{Fuel Mol. Wt.}/28.96)}}$$

Fuel gas saturation has been employed in a number of integrated gasification combined cycle (IGCC) installations over the last two decades. All IGCCs are designed with a backup fuel to increase plant availability, which is otherwise poor due to gasification system needs. Also, since syngas is high in hydrogen content, the syngas combustion system is designed for diffusion operation, which has much higher tolerance to fuel supply Wobbe number variation than the DLN combustion system employed on most modem natural gas fired turbines. Those two features of IGCC combustion systems combine to ease the challenges of bringing the fuel moisturization system on line. In particular, syngas is flared until it has reached design conditions (e.g., composition, purity, temperature and moisture content, etc.), during which time the gas turbine is fired using backup fuel. This decreases the range of operation on syngas and eases both the combustion system design and mode transition challenges. To our knowledge, no gas turbines or gas turbine combined cycle system with a fuel moisturization system has been built and operated without reliance on backup fuel for initial gas turbine firing.

BRIEF SUMMARY OF THE INVENTION

In accordance with a preferred embodiment of the present invention, there is provided a system configuration and associated control sequencing which enables a combined cycle system with fuel gas moisturization to start using cold, dry fuel gas and transition smoothly to heated moisturized fuel gas, preferably prior to entry into premixed combustion operation, without resort to backup fuel or temporary fuel stream flare. Similarly, shutdown and transient conditions are accommodated in the system configuration and its controls.

In a preferred embodiment of this invention, there is provided a process which enables the gas turbine startup on cold, dry gas fuel when heat is not initially available to operate the fuel gas superheater or the fuel moisturization system. The operation of the gas turbine fuel control system transitions smoothly from use of cold, dry fuel gas, through heated dry fuel gas and finally through heated moisturized fuel gas during startup after heat is available to operate the fuel gas superheater and the fuel moisturization a system, but before the unit reaches premixed combustion operation. The gas turbine system does not employ backup fuel or a temporary fuel stream flare during startup.

More particularly, in this preferred embodiment, a saturator fuel gas bypass enables cold, dry fuel gas to enter the superheater without passing through the fuel gas saturator. This bypass permits the fuel gas superheater to heat the fuel gas upon admission of heated water from the IP (intermediate pressure) economizer outlet of the HRSG (heat recovery steam generator) into the superheater. The bypass also enables the fuel gas superheater and the fuel gas saturator to be brought to operating temperature independently of one another and at controlled rates. This independent operation enables greater control and flexibility during startup. Additionally, the fuel gas saturator is isolated from the fuel gas superheater during low load operation. This isolation permits the fuel gas superheater to begin operation prior to addition of moisture to the fuel. Once the saturator water is heated and is pressurized, fuel gas admission to the saturator commences. For example, this may occur at approximately 30% load. Fuel gas admission then ramps up to full fuel gas flow, e.g., at approximately 35% load. When the saturator pressure reaches the dry fuel gas supply pressure, moisturized fuel gas is admitted to the fuel gas superheater for heating en route to the gas turbine.

From the foregoing, it will be appreciated that the system configuration enables the cold, dry fuel gas to initially bypass the saturator, enabling both the fuel superheater and fuel gas saturator to be brought to operating temperature independently and at a controlled rate. Additionally, the saturator is isolated from the fuel superheater during initial and low load operation, enabling the fuel gas superheater to begin operation prior to addition of moisture to the fuel gas. Aspects of the control sequencing to enable smooth transfer from cold, dry fuel gas to heated moisturized fuel gas include heating the cold, dry fuel in the fuel superheater prior to admission of moisturized (saturated) fuel gas to the fuel gas superheater. This enables moisture to be introduced as gradually as desired, while always maintaining adequate fuel superheat. Further, these control sequencing features enable transition from cold, dry fuel gas to heated, moisturized fuel gas before the combustion mode of the gas turbine transfers from diffusion operation to a premixed operation. This enables the gas fuel supply conditions to the gas turbine to be stabilized at rated conditions prior to combustion system operation in a mode that is most sensitive to variations in gas fuel supply conditions.

In another aspect of the present invention, shutdown of the system may be accomplished utilizing essentially a reverse of the startup procedure. Thus, when the plant unloads, e.g., to approximately 25% load, the fuel gas supply to the fuel gas saturator is ramped off over a predetermined time. Water flow to the saturator continues at a minimum flow. Water flow to the fuel gas superheater holds the fuel gas temperature to a desired temperature until the temperature of the fuel gas superheater discharge water exceeds the transfer pump suction temperature by approximately 25° F. At that point, the water flow to the superheater is modulated to minimize the temperature differential at the fuel superheater water return connection. The system is thus retained in a state of readiness should the operator elect to reload the plant. Water flow to the fuel gas superheater continues until the gas turbine fuel gas flow is shut off. Water flow to the fuel gas superheater is then shut off and the superheater remains full of water at the same pressure as the HRSG IP economizer. Thus, the shell sides of the fuel gas superheater and the fuel gas saturator are bottled up with dry fuel gas and a mixture of fuel gas and water vapor, respectively, and isolated from one another. Purging is not necessary unless maintenance access is required or if saturated drum water temperature drops below a predetermined temperature, e.g., approximately 70° F.

In a preferred embodiment according to the present invention, there is provided in a fuel supply system having a superheater for heating fuel gas for supply to a gas turbine, a saturator for moisturizing fuel gas and supplying moisturized fuel gas to the superheater during high load operation, and a dry fuel gas supply conduit for supplying fuel gas to the superheater and the saturator, a method of controlling the supply of fuel gas to the gas turbine during startup comprising the steps of (a) heating cold, dry fuel gas in the superheater and supplying the heated dry fuel gas from the superheater to the gas turbine before admitting moisturized fuel gas to the superheater.

In a further preferred embodiment according to the present invention, there is provided in a combined cycle system having a gas turbine, a heat recovery steam generator for recovering heat from gas turbine exhaust, a fuel superheater for heating fuel gas and supplying the heated fuel gas to the gas turbine, a fuel saturator for moisturizing fuel gas and supplying moisturized fuel gas to the fuel superheater during steady state operation and a dry fuel gas conduit for supplying dry fuel gas to the fuel superheater and the saturator, a method of controlling the supply of fuel gas to the gas turbine during startup, comprising the steps of (a) supplying dry fuel gas through the fuel superheater to the gas turbine, bypassing the fuel saturator, (b) supplying heated water to the fuel superheater to heat the fuel gas using heat recovered from the gas turbine exhaust in the heat recovery steam generator, (c) supplying heated water to the fuel saturator using heat recovered from the gas turbine exhaust in the heat recovery steam generator, (d) subsequent to step (a), admitting dry fuel gas into the fuel saturator and moisturizing the fuel gas using the heated water supplied to the fuel saturator and (e) transitioning from supplying dry fuel gas through the fuel superheater to the gas turbine to supplying heated moisturized fuel gas through the fuel superheater to the gas turbine, thereby supplying solely moisturized fuel gas to the gas turbine during premixed combustion operation.

DETAILED DESCRIPTION OF THE INVENTION

Figure 1:
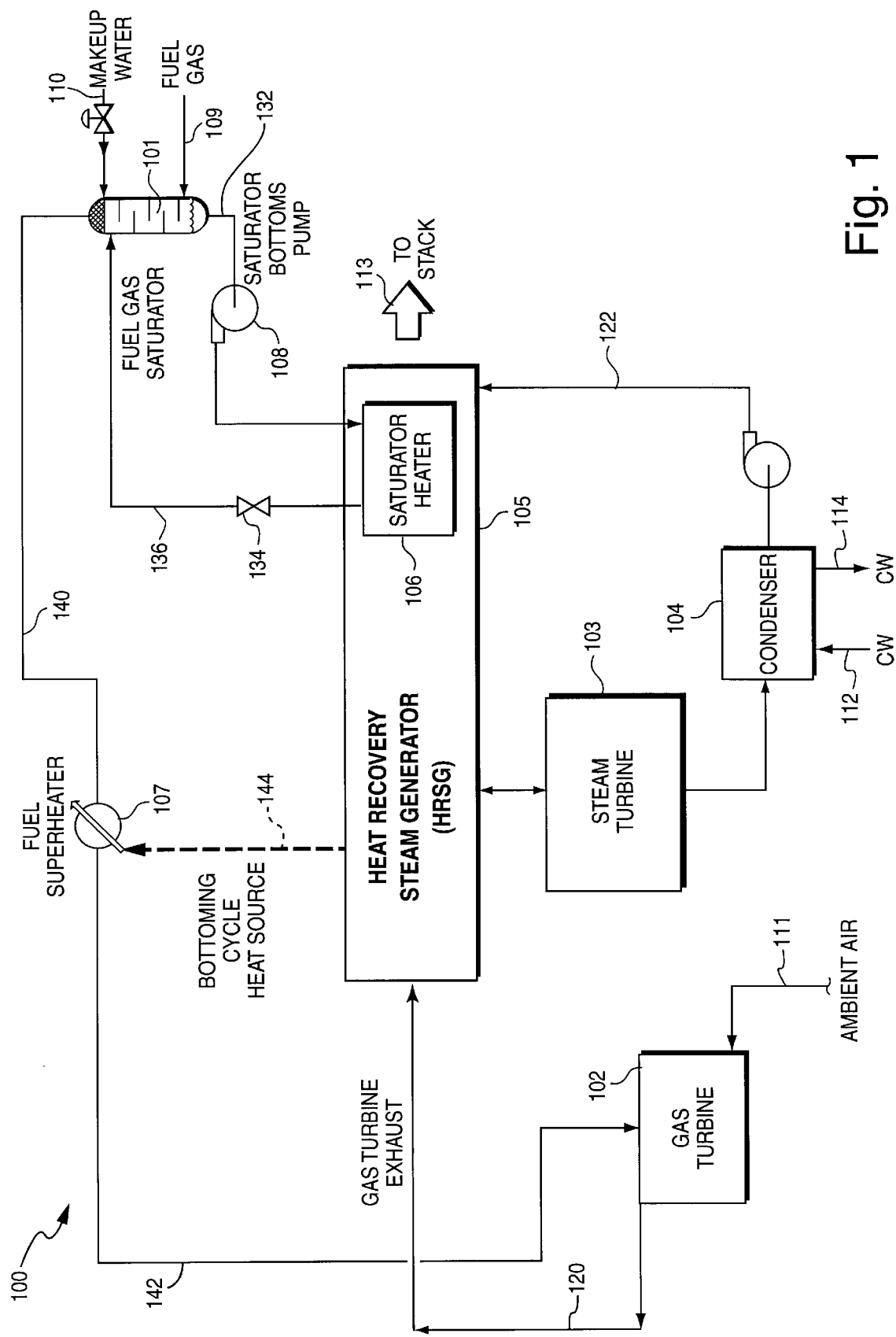
FIG. 1 is a schematic representation of a simplified natural gas fired combined cycle power plant in which the control system features of the present invention are employed.

While an exemplary simplified natural gas fired combined cycle power plant containing a modified bottoming cycle for fuel gas moisturization is illustrated in FIG. 1, the control system of the present invention is not intended to be limited solely to usage in this type of power plant. Also, the combined cycle plant depicted in FIG. 1 is more fully described in U.S. application Ser. No. 09/340,510, filed Jul. 1, 1999, of common assignee herewith.

In FIG. 1, a natural gas combined cycle power plant is generally designated 100 and includes a fuel gas saturator 101, a gas turbine 102, a steam turbine 103, a condenser 104, a heat recovery steam generator (HRSG) 105, a saturator heater 106, a fuel gas superheater 107, and a saturator bottoms pump 108. The chemical process inputs include dry fuel gas supplied to the saturator 101 via conduit 109, makeup water supplied to saturator 101 via conduit 110, ambient air input to the gas turbine 102 at 111, and cooling water supplied to condenser 104 via conduit 112. The chemical process outputs are stack gas 113 and water in conduit 114. The gas and steam turbines, of course, drive one or more generators, not shown, for generating electricity.

Dry fuel gas supplied via conduit 109 is bubbled through water in the fuel gas saturator 101, the latter comprising a packed or trayed column for moisturizing the fuel gas. The moisturized fuel gas exits the top of the saturator and is superheated in a fuel superheater 107 using a bottoming cycle heat source. From the fuel superheater 107, the superheated moisturized fuel gas enters the gas turbine 102 for combustion and generation of electricity by driving the generator(s), not shown. The hot gases of the gas turbine exhaust flow via conduit 120 to HRSG 105. HRSG 105 comprises a centralized heat exchanger having multiple units for recovering heat from the exhaust gases of the gas turbine 102, and which exhaust gases exit the HRSG 105 to a stack, indicated generally by the arrow 113. Heat recovered from the exhaust of the gas turbine 102 generates steam, which is used by steam turbine 103 which, in turn, drives one or more generators to generate electricity. The effluents from the steam turbine system are condensed in condenser 104 using cooling water 112 and returned to the HRSG 105 via conduit 122.

Water leaving the bottom of the fuel gas saturator 101 via conduit 132 is pumped by saturator bottoms pump 108 to HRSG 105 and recovers heat from the exhaust of the gas turbine 102 in saturator heater 106. The heated water is recycled and returned to the fuel gas saturator 101 via conduit 136 for moisturizing the dry fuel gas. Makeup water is added via conduit 110 to the fuel gas saturator recycle water to replace the water that exited the saturator with the moisturized fuel gas, and any blowdown from the saturator vessel, not shown.

Figure 2:
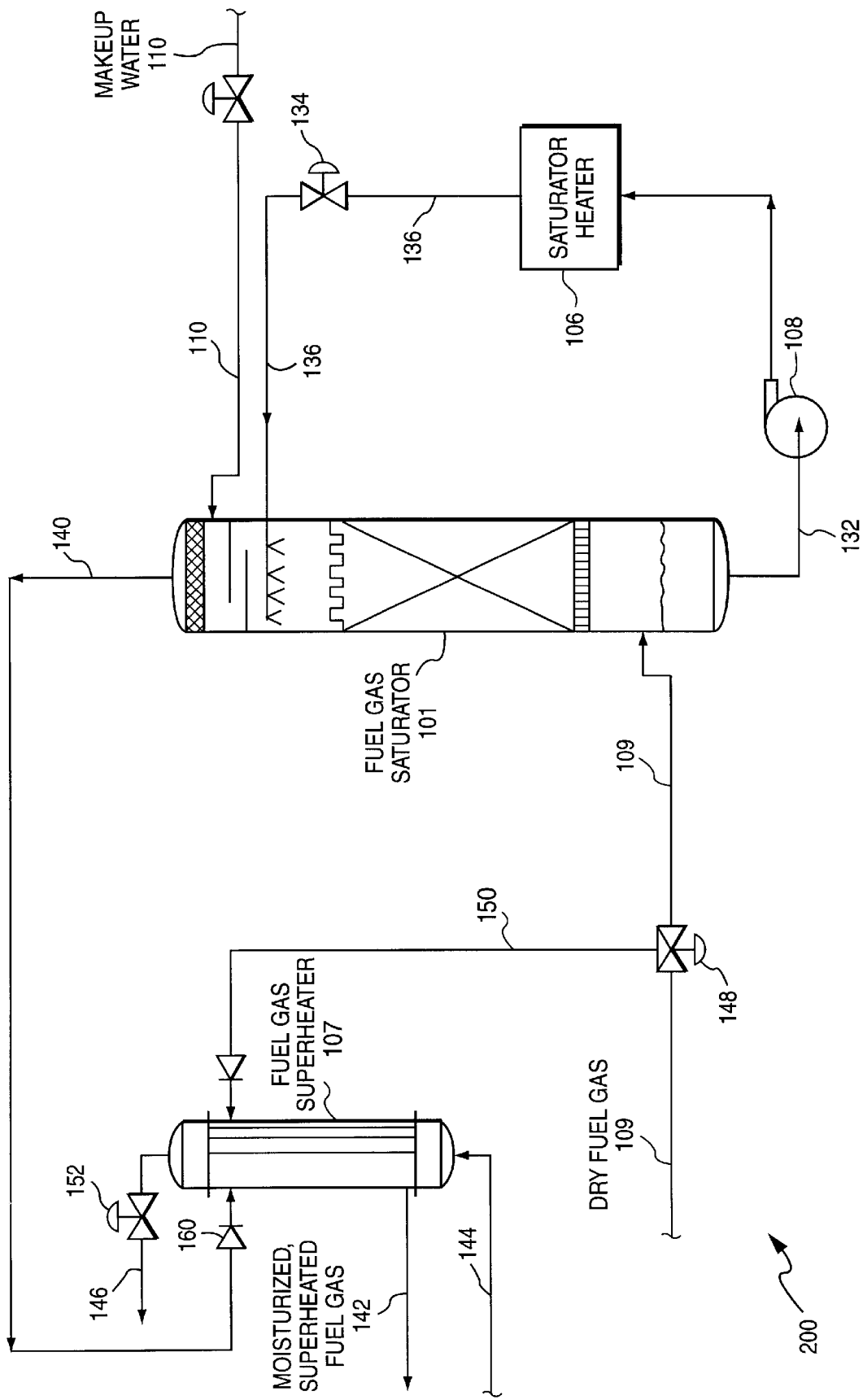
FIG. 2 is a schematic representation of a fuel gas superheater and a fuel gas saturator for use in the combined cycle power plant of FIG. 1 and illustrating a control system configuration hereof.

The fuel gas moisturization control system hereof is more particularly illustrated in FIG. 2. As noted previously, the fuel gas saturator 101 moisturizes the fuel gas, and the fuel gas superheater 107 superheats the moisturized fuel gas before admission to the gas turbine 102. A description of the operation of the fuel gas supply moisturization control during premixed combustion conditions is followed by a description of operation during startup, shutdown and a transient event.

During premixed combustion operation, the dry fuel gas supplied via conduit 109 enters the bottom of the fuel gas saturator 101. In the fuel gas saturator 101, the dry fuel gas contacts water input to saturator 101 via conduits 110 and 136. Excess water not vaporized exits the bottom of fuel gas saturator 101 via conduit 132. The excess water in conduit 132 is pumped by pump 108, is heated by saturator heater 106, and passes through valve 134 in conduit 136. The heated recycled water and the makeup water flows to the fuel gas saturator 101 via conduits 136 and 110, respectively. The moisturized fuel gas exits the fuel gas saturator 101 via conduit 140. After admission to the fuel gas superheater 107, the moisturized fuel gas is superheated, and exits the fuel gas superheater as moisturized, superheated fuel gas along conduit 142 for admission to gas turbine 102. Hot water heated by recovered heat from the gas turbine exhaust in HRSG 105 flows via conduit 144 to the fuel superheater 107 and lies in heat exchange relation to the moisturized fuel gas to heat the latter, and spent water exits superheater 107 via conduit 146. The flow of heating water through superheater 107 via conduit 144 is controlled by valve 152.

From the foregoing description and as illustrated in FIG. 2, it will be appreciated that the cold, dry fuel gas supplied saturator 101 via conduit 109 passes through a three-way valve 148, one part of which lies in communication via conduit 150 with superheater 107. During premixed combustion operation, valve 148 is closed to conduit 150 and supplies cold, dry fuel gas solely to saturator 101. At startup, unheated, cold, dry fuel gas is supplied solely to the gas turbine 102. To accomplish this, three-way valve 148 is opened to conduit 150 and closed to saturator 101, thereby bypassing saturator 101. Dry fuel gas thus passes solely through superheater 107 which at startup does not receive any heat input. Fuel gas heating water in conduit 144 enters the fuel superheater 107 from the IP (intermediate pressure) economizer of the HRSG 105 when the water in conduit 144 reaches a predetermined temperature. The water in conduit 144 is heated by heat recovered in the HRSG 105 in the IP economizer section. The flow of water via conduit 144 to the fuel superheater 107 is controlled to match the water temperature exiting the fuel superheater 107 via conduit 146 and the water temperature at its reentry point to the heat recovery system, not shown, by valve 152. The dry fuel gas temperature exiting the fuel superheater 107 via conduit 142 is below the base load target value temperature because the water supply has not yet reached its rated temperature associated with steady state fuel gas supply operation.

The saturation water circulating pump 108 is started when the feedwater transfer pump suction temperature reaches a predetermined temperature indicating availability of energy, which should occur approximately between twenty and ninety minutes prior to fuel gas admission to the fuel saturator 101. As the power plant starts up, the water in conduits 136 and 110 heats up and the saturator pressure increases, tracking the saturation pressure of the hot water entering the spray nozzles adjacent the top of fuel saturator 101. Minus a small portion that flashes to steam, the is water falls to the bottom of the fuel saturator 101 for recirculation to the saturation water heater 106 via pump 108. Water flow to the saturator 101 in conduit 136 is controlled to its minimum value, e.g., approximately 35% rated flow, and water flow in conduit 110 is controlled to maintain the saturator 101 sump water level.

Fuel admission to the saturator 101 begins at a predetermined load, e.g., a 30% load. Particularly, dry fuel gas flow in conduit 109 to the fuel gas saturator 101 is ramped from zero flow to full flow, corresponding to an approximate 35% plant load, over a time period, approximately one minute, by adjusting three-way valve 148. Alternatively, two two-way valves may replace the three-way valve 148. During the first few seconds of admission of fuel in conduit 109 to the saturator 101, the saturator 101 pressurizes from approximately 85 lbs/in$^2$ (gauge) to the fuel supply pressure. When the fuel gas saturator 101 reaches the dry fuel gas supply pressure, forward flow through the non-return valve 160 is established, thus admitting saturated fuel gas to the fuel superheater 107. During the transfer to heated, moisturized fuel gas, the plant loads, e.g., from approximately 30% to approximately 35%, and the fuel gas to the gas turbine changes from hot, dry fuel gas to hot, moisturized fuel gas. Circulation water in conduit 136 to the saturator 101 is constant during activation of the fuel moisturization system. However, circulation of water to the fuel superheater 107 is modulated to assure adequate fuel gas superheat to the lesser of two control signals: limiting the exit fuel temperature in conduit 142 to a target value or maintaining the exit water temperature within about 25° F. of the water temperature at its reentry point to the heat recovery system with valve 152.

The shutdown procedure substantially reverses the startup procedure, with an offset in plant load setpoints to avoid hysteresis. When the plant unloads, e.g., to approximately 25% load, the fuel gas is ramped off the saturator 101 by adjusting three-way valve 148 and directing the flow to conduit 150 over time, e.g., approximately one minute. Water flow in conduit 136 to the saturator 101 continues at the minimum flow level, until the breaker is opened. Water flow in conduit 144 to the fuel superheater 107 maintains the fuel temperature in conduit 142 until the temperature of the fuel superheater discharge water in conduit 146 exceeds the water temperature at its reentry point to the heat recovery system by approximately 25° F., at which point the water flow in stream 144 is modulated to minimize this temperature differential. This procedure retains the system in a state of readiness should the operator elect to reload the plant. Water flow in stream 144 to the fuel gas superheater 107 remains on until the gas turbine fuel flow in stream 142 is shut off. After the water flow in stream 144 has been shut off to the fuel gas superheater 107, the heater remains full of water at the same pressure as the HRSG IP economizer.

At this stage, the fuel gas superheater 107 contains dry fuel gas, and the fuel gas saturator 101 contains a mixture of fuel gas and water vapor, respectively. Additionally, the fuel gas superheater 107 and the fuel gas saturator 101 are isolated from each other. These process units are not vented or purged during shutdown except when necessary for maintenance access, or if the temperature of the water in the saturator sump Is below, e.g., 70° F.

The foregoing described system will also operate satisfactorily during contingency events, such as a sudden loss of load or a trip. If an unforeseen loss of electrical load occurs, the plant must be able to quickly reject load to avoid overspeed. In most cases, this involves reducing load in a matter of seconds below the threshold for operation of the fuel gas moisturization system. The fuel gas control valves are sufficiently active to accommodate this reduction. The fuel gas superheater and saturator circulating water controls are slightly slower but, as in the case of a normal shutdown, remain in service unless the breaker opens. The fuel moisturization system must also accommodate a partial load rejection, which in the extreme case could take the plant from base load to 50% load, e.g., in a second or two. The fuel flow in conduit 142 is reduced at an appropriate rate, and the circulating water flow to the fuel superheater 107 and the fuel gas saturator 101 would also follow under control action at a slightly slower rate. Fuel supply pressure for all of these situations remains essentially constant. The saturator supply water temperature at 136 remains essentially fixed as the heat recovery system responds to the power reduction transient. Reloading after a load rejection can happen in a matter of seconds.

As in the case of the load rejection discussed above, the fuel moisturization system is required to handle trip events. Trip events are similar to a load rejection, but a trip event may also involve a loss of water supply in conduits 110 and 144 to the fuel superheater 107 and fuel saturator 101, respectively. A restart after a trip might begin as soon as, e.g., thirty minutes after the event. The trip event occurs too fast to allow the normal process of shutting off fuel flow in stream 109 to the saturator 101 prior to taking the fuel superheater out of service. Consequently, the fuel superheater 107 and downstream fuel lines will contain moisturized fuel gas immediately following the trip. In order to address this, the fuel superheater 107 and downstream fuel lines are purged to an elevated vent with dry fuel gas following a trip to prevent moisture condensation in the fuel system while shut down.

As will be appreciated from the foregoing, the system is configured such that at startup, the cold, dry fuel gas bypasses the saturator 101 and is supplied directly to the fuel gas superheater for flow to the turbine. This enables both the fuel superheater 107 and the fuel gas saturator 101 to be brought to operating temperature independently of one another at a controlled rate. Further, the saturator 101 and fuel gas superheater 107 are isolated from one another during startup and low load operation. This enables the fuel superheater to begin operation prior to addition of moisture to the fuel. To perform a smooth transfer from cold, dry fuel gas to heated moisturized fuel gas, the dry fuel gas is heated in the fuel superheater prior to admission of saturated fuel gas to the fuel superheater. This enables moisture to be introduced gradually, while maintaining adequate fuel gas superheat. Additionally, the transition from cold, dry fuel gas to heated moisturized fuel Eat gas occurs before the gas turbine combustion mode transfers into premix operation. This enables the fuel supply conditions to the gas turbine to be stabilized at rated conditions prior to the combustion system operating in a mode that is most sensitive to variations in gas fuel supply conditions.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In a fuel supply system having a superheater for heating fuel gas for supply to a gas turbine, a saturator for moisturizing fuel gas and supplying moisturized fuel gas to the superheater during high load operation, and a dry fuel gas supply conduit for supplying fuel gas to said superheater and said saturator, a method of controlling the supply of fuel gas to the gas turbine during startup comprising the steps of:
   heating cold, dry fuel gas in said superheater and supplying said heated dry fuel gas from said superheater to the gas turbine before admitting moisturized fuel gas to said superheater.

2. A method according to claim 1 including admitting dry fuel gas into the saturator, heating water for use in the saturator to moisturize the fuel gas and supplying moisturized fuel gas to the superheater subsequent to supplying heated dry fuel gas from the superheater to the gas turbine.

3. A method according to claim 1 including transitioning from supplying cold, dry fuel gas to the gas turbine to supplying heated moisturized fuel gas to the gas turbine prior to transitioning the gas turbine into a premix at mode of combustion.

4. A method according to claim 1 including, from startup, ramping up the temperatures of said superheater and said saturator to operating temperatures independently of one another.

5. In a combined cycle system having a gas turbine, a heat recovery steam generator for recovering heat from gas turbine exhaust, a fuel superheater for heating fuel gas and supplying the heated fuel gas to the gas turbine, a fuel saturator for moisturizing fuel gas and supplying moisturized fuel gas to the fuel superheater during high load operation and a dry fuel gas conduit for supplying dry fuel gas to said fuel superheater and said fuel saturator, a method of controlling the supply of fuel gas to the gas turbine during startup, comprising the steps of:
   (a) supplying dry fuel gas through the fuel superheater to the gas turbine, bypassing said fuel saturator;
   (b) supplying heated water to said fuel superheater to heat the fuel gas using heat recovered from the gas turbine exhaust in the heat recovery steam generator;
   (c) supplying heated water to said fuel saturator using heat recovered from the gas turbine exhaust in the heat recovery steam generator;
   (d) subsequent to step (a), admitting dry fuel gas into said fuel saturator and moisturizing the fuel gas using the heated water supplied to the fuel saturator; and
   (e) transitioning from supplying dry fuel gas through the fuel superheater to the gas turbine to supplying heated moisturized fuel gas through said fuel superheater to said gas turbine, thereby supplying solely moisturized fuel gas to the turbine during high load operation.

6. A method according to claim 5 wherein step (e) is performed prior to transitioning the gas turbine into a premix mode of operation.

7. A method according to claim 5 including, from startup, ramping up the temperatures of said fuel superheater and said fuel saturator to operating temperatures independently of one another.

8. A method according to claim 5 wherein step (b) is performed prior to step (e).

* * * * *

UNITED STATES PATENT AND TRADEMARK OFFICE
CERTIFICATE OF CORRECTION

PATENT NO.    : 6,370,880 B1
DATED         : April 16, 2002
INVENTOR(S)   : Smith et al.

It is certified that error appears in the above-identified patent and that said Letters Patent is hereby corrected as shown below:

Column 1,
Line 61, delete "modem" and insert -- modern --.

Column 5,
Line 66, delete "is".

Column 6,
Line 59, delete "Is" and insert -- is --.

Column 7,
Line 49, delete "Eat"

Column 8,
Line 20, delete "at".

Signed and Sealed this

Third Day of September, 2002

*Attest:*

JAMES E. ROGAN
*Director of the United States Patent and Trademark Office*

*Attesting Officer*

UNITED STATES PATENT AND TRADEMARK OFFICE
CERTIFICATE OF CORRECTION

PATENT NO.        : 6,370,880 B1
APPLICATION NO. : 09/711173
DATED             : April 16, 2002
INVENTOR(S)       : Smith et al.

Page 1 of 1

It is certified that error appears in the above-identified patent and that said Letters Patent is hereby corrected as shown below:

Column 1, line 4, below the title, insert:

--The Government of the United States of America has rights in this invention pursuant to Contract No. DE-FC21-95MC31176 awarded by the U.S. Department of Energy.--

Signed and Sealed this

Twentieth Day of February, 2007

JON W. DUDAS
*Director of the United States Patent and Trademark Office*